US012150095B2

United States Patent
Foti et al.

(10) Patent No.: US 12,150,095 B2
(45) Date of Patent: Nov. 19, 2024

(54) DYNAMIC RSFP

(71) Applicant: Telefonaktiebolaget LM Ericsson (publ), Stockholm (SE)

(72) Inventors: George Foti, Dollard des Ormeaux (CA); Angel Navas Cornejo, Leganes (ES); Ralf Keller, Würselen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 163 days.

(21) Appl. No.: 17/254,550

(22) PCT Filed: Jun. 20, 2018

(86) PCT No.: PCT/IB2018/054545
§ 371 (c)(1),
(2) Date: Dec. 21, 2020

(87) PCT Pub. No.: WO2019/243872
PCT Pub. Date: Dec. 26, 2019

(65) Prior Publication Data
US 2021/0274472 A1 Sep. 2, 2021

(51) Int. Cl.
*H04W 72/02* (2009.01)
*H04W 8/20* (2009.01)
(Continued)

(52) U.S. Cl.
CPC ............ *H04W 72/02* (2013.01); *H04W 8/20* (2013.01); *H04W 72/0453* (2013.01); *H04W 72/56* (2023.01)

(58) Field of Classification Search
CPC ... H04W 72/02; H04W 8/20; H04W 72/0453; H04W 72/10; H04W 28/18; H04W 48/18; H04W 76/12; H04W 72/56
See application file for complete search history.

(56) References Cited

U.S. PATENT DOCUMENTS

2011/0176424 A1* 7/2011 Yang ............... H04L 41/082
370/235
2012/0295630 A1* 11/2012 Wang ............... H04W 8/24
455/452.1
(Continued)

FOREIGN PATENT DOCUMENTS

CN 102083056 A 6/2011
CN 103517325 A 1/2014
(Continued)

OTHER PUBLICATIONS

Author Unknown, "Technical Specification Group Services and System Aspects; System Architecture for the 5G system; Stage 2 (Release 15)," Technical Specification 23.501, Version 15.2.0, 3GPP Organizational Partners, Jun. 2018, 217 pages (Year: 2018).*
(Continued)

*Primary Examiner* — Thinh D Tran
(74) *Attorney, Agent, or Firm* — Sage Patent Group

(57) ABSTRACT

Systems and methods for dynamic Radio Access Technology (RAT)/Frequency Selection Priority (RFSP) selection for a User Equipment (UE) are disclosed. In some embodiments, a method of operation of a core network entity in a core network of a cellular communications system comprises selecting a RFSP index for a UE during setup of a packet data session for the UE where the RFSP index is an index to a specific Radio Resource Management (RRM) configuration for the UE and sending a message comprising the selected RFSP index to another core network entity. In some other embodiments, a method of operation of a core network entity comprises detecting an application that is using a packet data session of a UE, selecting a RFSP index for the UE based on the detected application, and sending a message comprising the RFSP index to another core network entity.

22 Claims, 7 Drawing Sheets

(51) Int. Cl.
*H04W 72/0453* (2023.01)
*H04W 72/56* (2023.01)

(56) References Cited

U.S. PATENT DOCUMENTS

| | | | | |
|---|---|---|---|---|
| 2015/0282058 | A1* | 10/2015 | Forssell | H04W 48/16 455/552.1 |
| 2020/0028783 | A1* | 1/2020 | Jin | H04W 8/04 |
| 2021/0084173 | A1* | 3/2021 | Sun | H04M 15/8038 |

FOREIGN PATENT DOCUMENTS

| | | | |
|---|---|---|---|
| EP | 2451220 A1 | 5/2012 | |
| EP | 2528389 A1 | 11/2012 | |
| WO | 2014056544 A1 | 4/2014 | |

OTHER PUBLICATIONS

3GPP TR 29-890 V15.1.0 (Mar. 2018); Technical Specification Group Core Network and Terminals; Study on CT WG3 Aspects of 5G System Phase 1; (Release 15); Mar. 2018; 9 pages. (Year: 2018).*

Author Unknown, "Technical Specification Group Services and System Aspects; Policy and Charging Control Framework for the 5G System; Stage 2 (Release 15)," Technical Specification 23.503, Version 15.2.0, 3GPP organizational Partners, Mar. 2018, 67 pages (Year: 2018).*

Author Unknown, LTE; General Packet Radio Service (GPRS) enhancement for Evolved Universal Terrestrial Radio Access Network (E-UTRA) access (3GPP 23.401 version 9.3.0 Release 9), European Telecommunications Standards Institute (ETSI), Technical Specification 123 401, Version 9.3.0, Jan. 2010, 256 pages.

Author Unknown, "Technical Specification Group Services and System Aspects; General Packet Radio Service (GPRS) enhancements for Evolved Universal Terrestrial Radio Access Network (E-UTRAN) access (Release 15)," Technical Specification 23.401, Version 15.3.0, 3GPP Organizational Partners, Mar. 2018, 405 pages.

Author Unknown, "Technical Specification Group Services and System Aspects; System Architecture for the 5G System; Stage 2 (Release 15)," Technical Specification 23.501, Version 15.1.0, 3GPP Organizational Partners, Mar. 2018, 201 pages.

Author Unknown, "Technical Specification Group Services and System Aspects; System Architecture for the 5G System; Stage 2 (Release 15)," Technical Specification 23.501, Version 15.2.0, 3GPP Organizational Partners, Jun. 2018, 217 pages.

Author Unknown, "Technical Specification Group Services and System Aspects; Procedures for the 5G System; Stage 2 (Release 15)," Technical Specification 23.502, Version 15.2.0, 3GPP Organizational Partners, Jun. 2018, 308 pages.

Author Unknown, "Technical Specification Group Services and System Aspects; Policy and Charging Control Framework for the 5G System; Stage 2 (Release 15)," Technical Specification 23.503, Version 15.2.0, 3GPP Organizational Partners, Mar. 2018, 67 pages.

Author Unknown, "Technical Specification Group Radio Access Network; Evolved Universal Terrestrial Radio Access (E-UTRA) and Evolved Universal Terrestrial Radio Access Network (E-UTRAN); Overall description; Stage 2 (Release 15)," Technical Specification 36.300, Version 15.1.0, 3GPP Organizational Partners, Mar. 2018, 341 pages.

Author Unknown, "Technical Specification Group Radio Access Network; Evolved Universal Terrestrial Radio Access Network (E-Utran); S1 Application Protocol (S1AP) (Release 15)," Technical Specification 36.413, Version 15.1.0, 3GPP Organizational Partners, Mar. 2018, 368 pages.

International Search Report and Written Opinion for International Patent Application No. PCT/IB2018/054545, mailed Mar. 21, 2019, 14 pages.

Office Action mailed Aug. 2, 2023 for Chinese Application No. 201880094797.2, 10 pages. (Includes English translation).

3GPP TR 29-890 V15.1.0 (Mar. 2018); Technical Specification Group Core Network and Terminals; Study on CT WG3 Aspects of 5G System Phase 1; (Release 15); Mar. 2018; 9 pages.

Second Office Action dated Oct. 8, 2023 for Chinese Patent Application No. 201880094797.2, 13 pages (includes English translation).

\* cited by examiner

DYNAMIC RSFP

This application is a 35 U.S.C. § 371 national phase filing of International Application No. PCT/IB2018/054545, filed Jun. 20, 2018, the disclosure of which is incorporated herein by reference in its entirety.

TECHNICAL FIELD

The present disclosure relates to Radio Access Technology (RAT)/Frequency Selection Priority (RFSP) in a cellular communications network.

BACKGROUND

In Third Generation Partnership Project (3GPP) Long Term Evolution (LTE) as well as in 3GPP Fifth Generation (5G) New Radio (NR), Radio Resource Management (RRM) is performed in the Radio Access Network (RAN) based on User Equipment (UE) specific RRM configurations. In other words, the RRM for a particular UE is performed based on a RRM configuration for that UE. To support RRM in the RAN, the core network (e.g., a Mobility Management Entity (MME) in the Evolved Packet Core (EPC) or an Access and Mobility Management Function (AMF) in a 5G Core (5GC)) provides an "index to a Radio Access Technology (RAT)/Frequency Selection Priority" (RFSP index) to the radio access node (e.g., an enhanced or evolved Node B (eNB) for LTE or a NR base station (gNB) for 5G NR). At the radio access node, the RFSP index for a particular UE is mapped to a RRM configuration to be used for that UE.

Currently, in LTE and 5G NR, the RFSP index is a subscription parameter for a UE that is conveyed to the MME/AMF during the attach/registration procedure. The MME/AMF provides the received RFSP index to the respective eNB/gNB, where the RFSP index for the UE is mapped to a locally defined RRM configuration in order to apply specific RRM strategies for that UE.

Specifically, for LTE, 3GPP Technical Specification (TS) 23.401 V15.3.0 provides the following:

4.3.6 Radio Resource Management functions

Radio resource management functions are concerned with the allocation and maintenance of radio communication paths, and are performed by the radio access network. The RRM strategy in E-UTRAN may be based on user specific information.

To support radio resource management in E-UTRAN the MME provides the parameter 'Index to RAT/Frequency Selection Priority' (RFSP Index) to an eNodeB across S1. The RFSP Index is mapped by the eNodeB to locally defined configuration in order to apply specific RRM strategies. The RFSP Index is UE specific and applies to all the Radio Bearers. Examples of how this parameter may be used by the E-UTRAN:

to derive UE specific cell reselection priorities to control idle mode camping.

to decide on redirecting active mode UEs to different frequency layers or RATs.

The MME receives the subscribed RFSP Index from the HSS (e.g., during the Attach procedure). For non-roaming subscribers the MME chooses the RFSP Index in use according to one of the following procedures, depending on operator's configuration:

the RFSP Index in use is identical to the subscribed RFSP Index, or the MME chooses the RFSP Index in use based on the subscribed RFSP Index, the locally configured operator's policies and the UE related context information available at the MME, including UE's usage setting and voice domain preference for E-UTRAN, if received during Attach and Tracking Area Update procedures (see clause 4.3.5.9).

NOTE: One example of how the MME can use the "UE voice capabilities and settings" is to select an RFSP value that enforces idle mode camping on 2G/3G for a UE acting in a "Voice centric" way and provisioned with "CS Voice preferred, IMS Voice as secondary", in order to minimize the occurrancy of RAT changes. Another example is the selection of an RFSP value that prevents idle mode camping on 2G for a UE provisioned with "IMS PS voice preferred, CS Voice as secondary" if other RATs supporting IMS Voice are available, as the UE would in such case always select the CS domain for its voice calls.

For roaming subscribers the MME may alternatively choose the RFSP Index in use based on the visited network policy, but can take input from the HPLMN into account (e.g., an RFSP Index value pre-configured per HPLMN, or a single RFSP Index value to be used for all roamers independent of the HPLMN).

The MME forwards the RFSP Index in use to the eNodeB across S1. The RFSP Index in use is also forwarded from source eNodeB to target eNodeB when X2 is used for intra-E-UTRAN handover.

The MME stores the subscribed RFSP Index value received from the HSS and the RFSP Index value in use. During the Tracking Area Update procedure, the MME may update the RFSP Index value in use (e.g. the MME may need to update the RFSP Index value in use if the UE related context information in the MME has changed). When the RFSP Index value in use is changed, the MME immediately provides the updated RFSP Index value in use to eNodeB by modifying an existing UE context or by establishing an new UE context in the eNodeB or by being configured to include the updated RFSP Index value in use in the DOWNLINK NAS TRANSPORT message if the user plane establishment is not needed. During inter-MME mobility procedures, the source MME forwards both RFSP Index values to the target MME. The target MME may replace the received RFSP Index value in use with a new RFSP Index value in use that is based on the operator's policies and the UE related context information available at the target MME.

The S1 messages that transfer the RFSP Index to the eNodeB are specified in TS 36.413 [36]. Refer to TS 36.300 [5] for further information on E-UTRAN.

Similarly, for 5G NR, 3GPP TS 23.501 V15.1.0 provides the following:

5.3.4.3 Radio Resource Management functions

To support radio resource management in RAN the AMF provides the parameter 'Index to RAT/Frequency Selection Priority' (RFSP Index) to RAN across N2. The RFSP Index is mapped by the RAN to locally defined configuration in order to apply specific RRM strategies. The RFSP Index is UE specific and applies to all the Radio Bearers. Examples of how this parameter may be used by the RAN:

to derive UE specific cell reselection priorities to control idle mode camping.

to decide on redirecting active mode UEs to different frequency layers or RATs.

The AMF receives the subscribed RFSP Index from the UDM (e.g., during the Registration procedure). For non-roaming subscribers, the AMF chooses the RFSP Index in use according to one of the following procedures, depending on operator's configuration:

the RFSP Index in use is identical to the subscribed RFSP Index, or the AMF chooses the RFSP Index in use based on the subscribed RFSP Index, the locally configured operator's policies and the UE related context information available at the AMF, including UE's usage setting, if received during Registration procedures (see clause TS 23.502 [3]).

NOTE: One example of how the AMF can use the "UE's usage setting," is to select an RFSP value that enforces idle mode camping on E-UTRA for a UE acting in a "Voice centric" way, in case voice over NR is not supported in the specific Registration Area and it contains NR cells.

The AMF may report to the PCF the subscribed RFSP Index received from the UDM for further evaluation as described in clause 6.1.2.1 in TS 23.503 [45]. When receiving the authorized RFSP Index from the PCF, the AMF shall replace the subscribed RFSP Index with the authorized RFSP Index.

For roaming subscribers the AMF may alternatively choose the RFSP Index in use based on the visited network policy, but can take input from the HPLMN into account (e.g., an RFSP Index value pre-configured per HPLMN, or a single RFSP Index value to be used for all roamers independent of the HPLMN).

The RFSP Index in use is also forwarded from source to target RAN node when Xn or N2 is used for intra-NG-RAN handover.

The AMF stores the subscribed RFSP Index value received and the RFSP Index value in use. During the Registration Update procedure, the AMF may update the RFSP Index value in use (e.g. the AMF may need to update the RFSP Index value in use if the UE related context information in the AMF has changed). When the RFSP Index value in use is changed, the AMF immediately provides the updated RFSP Index value in use to NG-RAN node by modifying an existing UE context or by establishing a new UE context in RAN or by being configured to include the updated RFSP Index value in use in the DOWNLINK NAS TRANSPORT message if the user plane establishment is not needed. During inter-AMF mobility procedures, the source AMF forwards both RFSP Index values to the target AMF. The target AMF may replace the received RFSP Index value in use with a new RFSP Index value in use that is based on the operator's policies and the UE related context information available at the target AMF.

Examples for use of RFSP index: As an example of how the MME can use the "UE voice capabilities and settings" is to select an RFSP index value that enforces idle mode camping on Second Generation/Third Generation (2G/3G) for a UE acting in a "voice centric" way and provisioned with "CS Voice preferred, IMS Voice as secondary," in order to minimize the occurrence of RAT changes. Another example is the selection of a RFSP index value that prevents idle mode camping on 2G for a UE provisioned with "IMS PS voice preferred, CS Voice as secondary" if other RATs supporting Internet Protocol (IP) Multimedia Subsystem (IMS) Voice are available, as the UE would in such case always select the Circuit Switched (CS) domain for its voice calls.

SUMMARY

Systems and methods for dynamic Radio Access Technology (RAT)/Frequency Selection Priority (RFSP) selection for a User Equipment (UE) are disclosed. In some embodiments, a method of operation of a core network entity in a core network of a cellular communications system comprises selecting a RFSP index for a UE during setup of a packet data session for the UE. The RFSP index is an index to a specific Radio Resource Management (RRM) configuration for the UE. The method further comprises sending a message comprising the selected RFSP index to another core network entity. In this manner, the RFSP index for the UE is dynamically selected, or updated, during setup of the packet data session.

In some embodiments, selecting the RFSP index for the UE during setup of the packet data session for the UE comprises selecting the RFSP index for the UE during setup of the packet data session for the UE based on one or more rules. The one or more rules are based on a Data Network Name (DNN) identified for the packet data session, subscriber data associated with the UE, allowed applications for a packet data session associated with the UE, a physical location of the UE, and/or one or more other packet data sessions of the UE. In some embodiments, the one or more rules comprise at least one rule that is based on the subscriber data associated with the UE, and the subscriber data comprises an amount of data consumed by a subscriber associated with the UE from a specified data limit for the subscriber.

In some embodiments, the core network entity is a Policy Control Function (PCF), and the method further comprises receiving a message from a Session Management Function (SMF) during setup of the packet data session for the UE. Sending the message comprising the selected RFSP index to another core network entity comprises sending the message comprising the selected RFSP index to the SMF.

In some embodiments, the method further comprises, after setup of the packet data session for the UE is complete, detecting an application that is using the packet data session, selecting a new RFSP index for the UE based on the detected application and its characteristics, and sending a message comprising the new RFSP index to another core network entity. Further, in some embodiments, the new RFSP index is an RFSP index that initiates a handover decision for the UE. In some embodiments, selecting the new RFSP index for the UE comprises selecting the new RFSP index for the UE based on the detected application and one or more rules, where the one or more rules are based on: a DNN identified for the packet data session, subscriber data associated with the UE, allowed applications for a packet data session associated with the UE, a physical location of the UE, and/or one or more other packet data sessions of the UE. In some embodiments, the core network entity is a PCF, and sending the message comprising the new RFSP index to another core network entity comprises sending the message comprising the new RFSP index to a SMF associated with the UE. In some embodiments, the method further comprises receiving, a message from an Application Function (AF), and sending the message comprises sending the message to the SMF associated with the UE in response to receiving the AAR message from the AF.

Embodiments of a core network entity are also disclosed. In some embodiments, a core network entity for a core network of a cellular communications system is adapted to select a RFSP index for a UE during setup of a packet data session for the UE. The RFSP index is an index to a specific RRM configuration for the UE. In some embodiments, the core network entity is further adapted to send a message comprising the selected RFSP index to another core network entity.

Embodiments of a node implementing a core network entity are also disclosed. In some embodiments, a node implementing a core network entity for a core network of a cellular communications system comprises a network interface, one or more processors, and memory storing instructions executable by the one or more processors whereby the node is operable to select a RFSP index for a UE during setup of a packet data session for the UE where the RFSP index is an index to a specific RRM configuration for the UE and send a message comprising the selected RFSP index to another core network entity.

Embodiments of a method of operation of a radio access node in a Radio Access Network (RAN) of a cellular communications system are also disclosed. In some embodiments, a method of operation of a radio access node in a RAN of a cellular communications system comprises receiving a RFSP index for a UE during setup of a packet data session for the UE. The RFSP index is an index to a specific RRM configuration for the UE. The method further comprises applying the specific RRM configuration indexed by the RFSP index for the UE.

In some embodiments, receiving the RFSP index for the UE during setup of the packet data session for the UE comprises receiving a packet data session request message from a core network entity, where the packet data session request message comprises the RFSP index.

Embodiments of a radio access node for a RAN of a cellular communications system are also disclosed. In some embodiments, a radio access node for a RAN of a cellular communications system is adapted to receive a RFSP index for a UE during setup of a packet data session for the UE. The RFSP index is an index to a specific RRM configuration for the UE. The radio access node is further adapted to apply the specific RRM configuration indexed by the RFSP index for the UE.

In some embodiments, a radio access node for a RAN of a cellular communications system comprises a network interface, one or more processors, and memory storing instructions executable by the one or more processors whereby the radio access node is operable to receive a RFSP index for a UE during setup of a packet data session for the UE where the RFSP index is an index to a specific RRM configuration for the UE and apply the specific RRM configuration indexed by the RFSP index for the UE.

Some other embodiments of a method of operation of a core network entity in a core network of a cellular communications system are also disclosed. In some embodiments, a method of operation of a core network entity in a core network of a cellular communications system comprises detecting an application that is using a packet data session of a UE, selecting a RFSP index for the UE based on the detected application where the RFSP index is an index to a specific RRM configuration for the UE, and sending a message comprising the RFSP index to another core network entity.

In some embodiments, selecting the RFSP index for the UE comprises selecting the RFSP index for the UE based on the detected application and one or more rules, where the one or more rules are based on a DNN identified for the packet data session, subscriber data associated with the UE, allowed applications for a packet data session associated with the UE, a physical location of the UE, and/or one or more other packet data sessions of the UE. In some embodiments, the one or more rules comprise at least one rule that is based on the subscriber data associated with the UE, and the subscriber data comprises an amount of data consumed by a subscriber associated with the UE from a specified data limit for the subscriber. In some embodiments, the core network entity is a PCF, and sending the message comprising the selected RFSP index to another core network entity comprises sending the message comprising the selected RFSP index to a SMF associated with the UE. In some embodiments, the method further comprises receiving, a message from an AF, and sending the message comprises sending the message to the SMF associated with the UE in response to receiving the AAR message from the AF.

Some other embodiments of a core network entity for a core network of a cellular communications system are also disclosed. In some embodiments, a core network entity for a core network of a cellular communications system is adapted to detect an application that is using a packet data session of a UE, select a RFSP index for the UE based on the detected application where the RFSP index is an index to a specific RRM configuration for the UE, and send a message comprising the RFSP index to another core network entity.

Some other embodiments of a node implementing a core network entity for a core network of a cellular communications system are also disclosed. In some embodiments, a node implementing a core network entity for a core network of a cellular communications system comprises a network interface, one or more processors, and memory storing instructions executable by the one or more processors whereby the node is operable to detect an application that is using a packet data session of a UE, select a RFSP index for the UE based on the detected application where the RFSP index is an index to a specific RRM configuration for the UE, and send a message comprising the RFSP index to another core network entity.

Some other embodiments of a method of operation of a radio access node in a RAN of a cellular communications system are also disclosed. In some embodiments, a method of operation of a radio access node in a RAN of a cellular communications system comprises receiving a new RFSP index for a UE after setup of a packet data session for the UE. The new RFSP index is an index to a specific RRM configuration for the UE. The method further comprises applying the specific RRM configuration indexed by the new RFSP index for the UE.

In some embodiments, receiving the new RFSP index for the UE comprises receiving a packet data session request message from a core network entity, where the packet data session request message comprises the new RFSP index.

Some other embodiments of a radio access node for a RAN of a cellular communications system are also disclosed. In some embodiments, a radio access node for a RAN of a cellular communications system is adapted to receive a new RFSP index for a UE after setup of a packet data session for the UE. The new RFSP index is an index to a specific RRM configuration for the UE. The radio access node is further adapted to apply the specific RRM configuration indexed by the new RFSP index for the UE.

In some embodiments, a radio access node for a RAN of a cellular communications system comprises a network interface, one or more processors, and memory storing instructions executable by the one or more processors whereby the radio access node is operable to receive a new RFSP index for a UE after setup of a packet data session for the UE where the new RFSP index being an index to a specific RRM configuration for the UE and apply the specific RRM configuration indexed by the new RFSP index for the UE.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
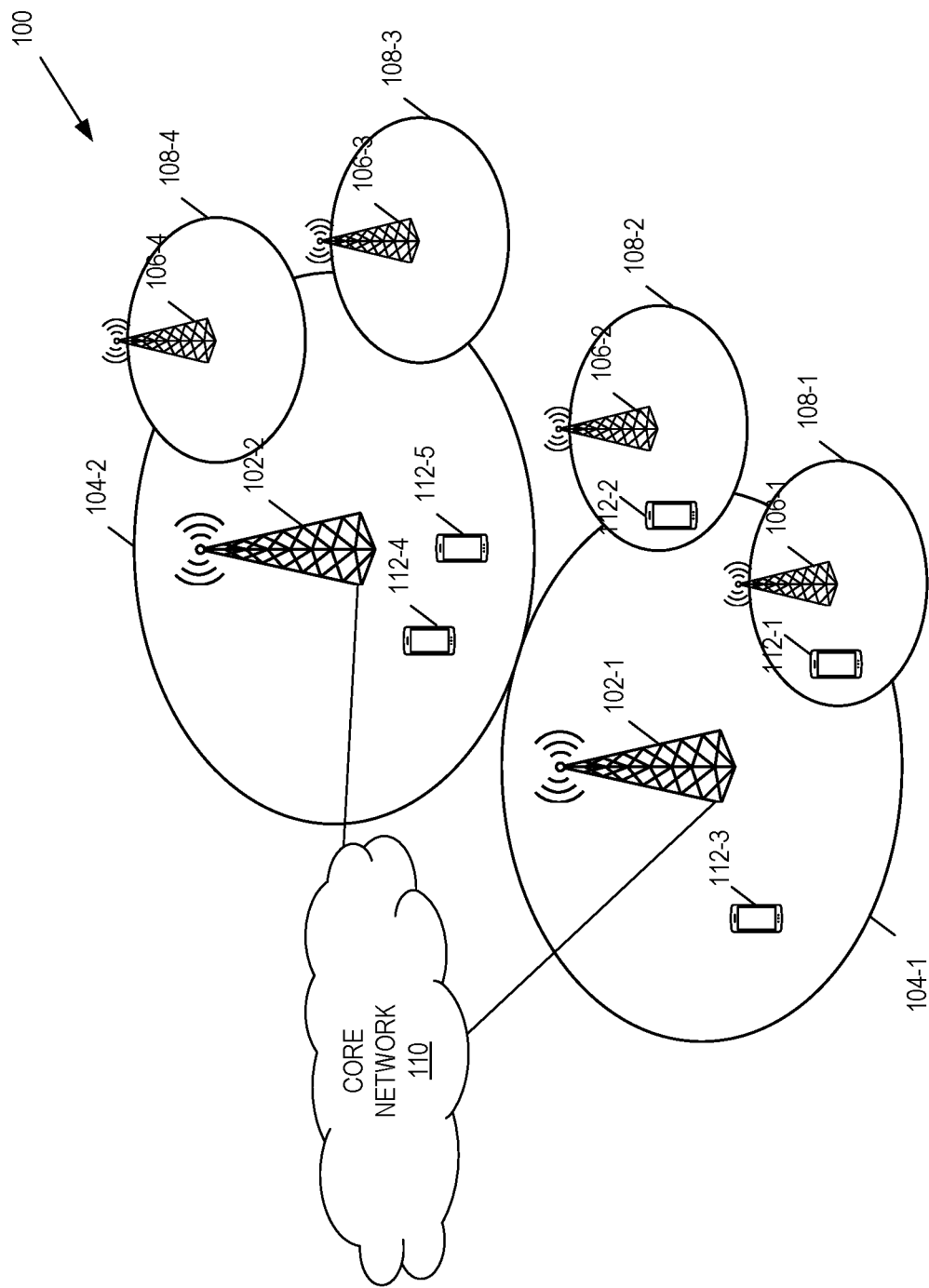
FIG. 1 illustrates one example of a cellular communications network according to some embodiments of the present disclosure.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Entity: As used herein, a core network entity is an entity in a core network. In other words, a core network entity is an entity that implements a function in the Evolved Packet Core (EPC) network (e.g., a Mobility Management Entity (MME), a Packet Data Network Gateway (P-GW), or the like) or a network function in the 5GC network (e.g., an Access and Mobility Management Function (AMF), a Session Management Function (SMF), a Policy Control Function (PCF), or the like). A core network entity may be implemented either as a network element on a dedicated hardware, as a software instance running on a dedicated hardware, or as a virtualized function instantiated on an appropriate platform, e.g., a cloud infrastructure.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the RAN or a node that implements a core network entity (e.g., a core network node or a node implementing a core network function).

Packet Data Session: As used herein, a "packet data session" is a Packet Data Unit (PDU) session (e.g., a PDU session in a 5G system including a 5G Core (5GC)) or a Packet Data Network (PDN) session (e.g., a PDN session in a LTE system including an Evolved Packet Core (EPC)).

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell;" however, particularly with respect to 5G NR concepts, beams may be used instead of cells and, as such, it is important to note that the concepts described herein are equally applicable to both cells and beams.

Increasingly, wireless devices are loaded with applications exhibiting different needs for speed, coverage, and latency. In the presence of a single deployed Access Network (AN), the requirements for all these applications need to be met by that AN, i.e., there is no choice between different ANs. However, the reality is that there are numerous ANs (e.g., Third Generation (3G), Fourth Generation (4G), and/or 5G networks) deployed and co-existing with various degrees of coverage, overlap, and data rates. Hence, it is desirable to optimize the utilization of the existing ANs by ensuring that applications are able to use the ANs that fulfil their needs, where those needs are, e.g., data rate related needs, coverage related needs (e.g., there is a desire to avoid handover or handover is acceptable), Quality of Service (QoS) related needs, operator preference, subscription level (e.g., Gold, Silver, Bronze), etc.

Systems and methods are disclosed herein for dynamically selecting the "Index to Radio Access Technology (RAT/Frequency Selection Priority" (RFSP Index) for a UE. This dynamic selection enables the RFSP index for a UE to be dynamically selected in such a manner as to accommodate, e.g., the different needs of different applications that can be used by the UE.

As discussed in the Background, the RFSP index is used to support Radio Resource Management (RRM) in the RAN. Currently, in 3GPP LTE and 5G NR, the RFSP index is a subscription parameter for the UE and is conveyed to the MME/AMF during attach/registration procedure. The MME/AMF provides the received RFSP index for the UE to the respective eNB/gNB, where the RFSP index for the UE is mapped to a locally defined RRM configuration in order to apply specific RRM strategies for the UE.

Systems and methods are disclosed herein for dynamically adjusting the RFSP index for a UE. In some embodiments, the RFSP index for the UE is dynamically selected at PDU session setup, e.g., to cater to application needs. In some embodiments, the RFSP index is selected during PDU session setup for the UE based on one or more rules (e.g., operator policies that are configured, e.g., in the PCF). The one or more rules are based on criteria such as, e.g., a subscriber profile of a subscriber associated with the UE, information that indicates one or more applications allowed for the UE, a Data Network Name (DNN) for the PDU session, and/or information regarding one or more other PDU sessions established for the UE. In this manner, different RFSP indices (i.e., different RFSP index values) can be selected at PDU session setup depending on these various criteria. In some embodiments, the RFSP index is updated after the PDU session is established in response to detecting a particular application using the PDU session. For instance, the PCF may be notified by the SMF when a certain application starts, or the PCF may detect a certain application when a request from a respective Application Function (AF) is received by the PCF.

In some embodiments, a RFSP index for a UE is dynamically selected by a PCF during PDU session establishment for the UE. The PCF sends the selected RFSP index to a respective AMF. The AMF then sends the selected RFSP index to the respective radio access node (i.e., gNB) via an N2 interface. In some embodiments, the AMF may decide whether or not to send the selected RFSP index for the UE to the radio access node. In some embodiments, in the event that a UE creates two PDU sessions that result in conflicting RFSP indices, the PCF can reject the second PDU session, or preferably select an RFSP index that is optimized for both PDU sessions. In this case, the PCF sends the selected RFSP index to the AMF for the first created PDU session and/or for the new, or second, created PDU session for the UE. This RFSP index is passed on to the radio access node associated via the AMF with the PDU session(s).

While not be limited to or by any particular advantage, embodiments of the present disclosure provide a number of advantages over conventional cellular communications systems. For example, embodiments of the present disclosure provide a scheme for dynamically selecting and updating the RFSP index of a UE, e.g., using a modified existing information element, to optimize radio resources depending on currently used applications.

In this regard, FIG. 1 illustrates one example of a cellular communications network 100 according to some embodiments of the present disclosure. In the embodiments described herein, the cellular communications network 100 is a 5G NR network. In this example, the cellular communications network 100 includes base stations 102-1 and 102-2, which in 5G NR are referred to as gNBs, controlling corresponding macro cells 104-1 and 104-2. The base stations 102-1 and 102-2 are generally referred to herein collectively as base stations 102 and individually as base station 102. Likewise, the macro cells 104-1 and 104-2 are generally referred to herein collectively as macro cells 104 and individually as macro cell 104. The cellular communications network 100 may also include a number of low power nodes 106-1 through 106-4 controlling corresponding small cells 108-1 through 108-4. The low power nodes 106-1 through 106-4 can be small base stations (such as pico or femto base stations) or Remote Radio Heads (RRHs), or the like. Notably, while not illustrated, one or more of the small cells 108-1 through 108-4 may alternatively be provided by the base stations 102. The low power nodes 106-1 through 106-4 are generally referred to herein collectively as low power nodes 106 and individually as low power node 106. Likewise, the small cells 108-1 through 108-4 are generally referred to herein collectively as small cells 108 and individually as small cell 108. The base stations 102 (and optionally the low power nodes 106) are connected to a core network 110.

The base stations 102 and the low power nodes 106 provide service to wireless devices 112-1 through 112-5 in the corresponding cells 104 and 108. The wireless devices 112-1 through 112-5 are generally referred to herein collectively as wireless devices 112 and individually as wireless device 112. The wireless devices 112 are also sometimes referred to herein as UEs.

Figure 2:
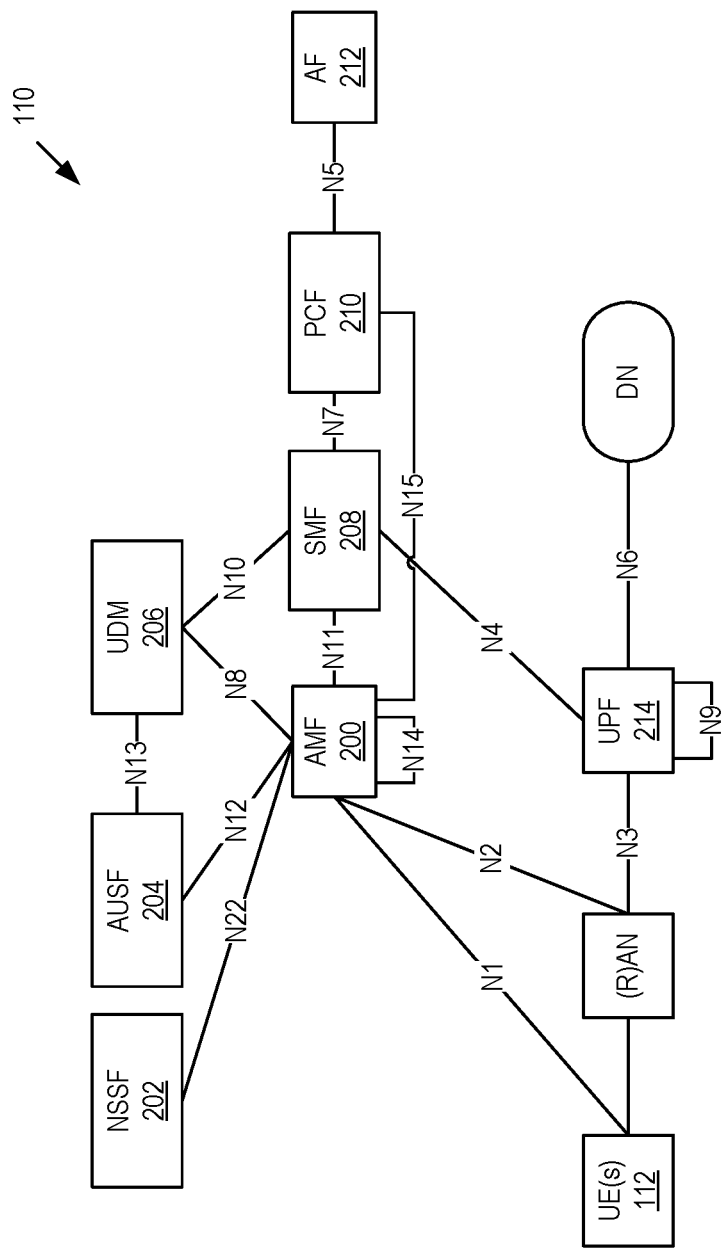
FIG. 2 illustrates a wireless communication system represented as a Fifth Generation (5G) network architecture composed of core Network Functions (NFs), where interaction between any two NFs is represented by a point-to-point reference point/interface.

FIG. 2 illustrates a wireless communication system represented as a 5G network architecture composed of core NFs, where interaction between any two NFs is represented by a point-to-point reference point/interface. FIG. 2 can be viewed as one particular implementation of the system 100 of FIG. 1.

Seen from the access side the 5G network architecture shown in FIG. 2 comprises a plurality of UEs 112 connected to either a RAN or an AN as well as an AMF 200. Typically, the R(AN) comprises base stations, e.g. such as the base stations 102 or similar. Seen from the core network side, the 5G core NFs shown in FIG. 2 include a Network Slice Selection Function (NSSF) 202, an Authentication Server Function (AUSF) 204, a Unified Data Management (UDM) 206, an AMF 200, a SMF 208, a PCF 210, and an AF 212. Note that the AF 212 is not in the trusted operator domain (i.e., is not actually part of the core network), but has access to the core network via a Network Expososure Function (see FIG. 2).

Reference point representations of the 5G network architecture are used to develop detailed call flows in the normative standardization. The N1 reference point is defined to carry signaling between the UE 112 and the AMF 200. The reference points for connecting between the AN (e.g., base station 102) and the AMF 200 and between the AN (e.g., the base station 102) and a User Plane Function (UPF) 214 are defined as N2 and N3, respectively. There is a reference point, N11, between the AMF 200 and the SMF 208. N4 is used by the SMF 208 and the UPF 214 so that the UPF 214 can be set using the control signal generated by the SMF 208, and the UPF 214 can report its state, and events, to the SMF 208. N9 is the reference point for the connection between different UPFs 214, and N14 is the reference point connecting between different AMFs 200, respectively. N15 and N7 are defined since the PCF 210 applies policy to the AMF 200 and SMF 208, respectively. N12 is required for the AMF 200 to perform authentication of the UE 112. N8 and N10 are defined because the subscription data of the UE 112 is required for the AMF 200 and the SMF 208.

The 5GC network aims at separating user plane and control plane. The user plane carries user traffic while the control plane carries signaling in the network. In FIG. 2, the UPF 214 is in the user plane and all other NFs, i.e., the AMF 200, the SMF 208, the PCF 210, the AF 212, the AUSF 204, and the UDM 206, are in the control plane. Separating the user and control planes guarantees each plane resource to be scaled independently. It also allows the UPFs 214 to be deployed separately from control plane functions in a distributed fashion. In this architecture, the UPFs 214 may be deployed very close to UEs 112 to shorten the Round Trip Time (RTT) between UEs 112 and data network for some applications requiring low latency.

The core 5G network architecture is composed of modularized functions (see, e.g., 3GPP TS 23.501 V15.2.0, 3GPP TS 23.502 V15.2.0, and 3GPP TS 23.503 V15.2.0). For example, the AMF 200 and the SMF 208 are independent functions in the control plane. Separated AMF 200 and SMF 208 allow independent evolution and scaling. Other control plane functions like the PCF 210 and the AUSF 204 can be separated as shown in FIG. 2. Modularized function design enables the 5GC network to support various services flexibly.

Each NF interacts with another NF directly. It is possible to use intermediate functions to route messages from one NF to another NF. In the control plane, a set of interactions between two NFs is defined as service so that its reuse is possible. This service enables support for modularity. The user plane supports interactions such as forwarding operations between different UPFs.

Figure 3:
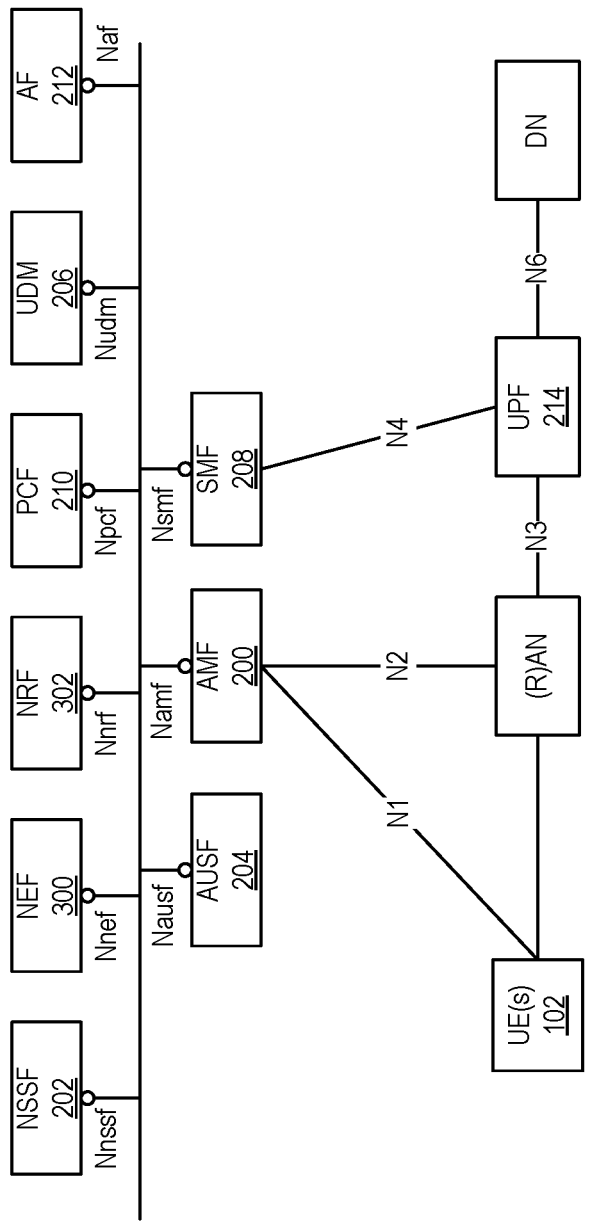
FIG. 3 illustrates a 5G network architecture using service-based interfaces between the NFs in the control plane, instead of the point-to-point reference points/interfaces used in the 5G network architecture of FIG. 2.

FIG. 3 illustrates a 5G network architecture using service-based interfaces between the NFs in the control plane, instead of the point-to-point reference points/interfaces used in the 5G network architecture of FIG. 2. However, the NFs described above with reference to FIG. 2 correspond to the NFs shown in FIG. 3. The service(s) etc. that a NF provides to other authorized NFs can be exposed to the authorized NFs through the service-based interface. In FIG. 3 the service based interfaces are indicated by the letter "N" followed by the name of the NF, e.g. Namf for the service based interface of the AMF and Nsmf for the service based interface of the SMF etc. A Network Exposure Function (NEF) 300 and a Network Repository Function (NRF) 302 in FIG. 3 are not shown in FIG. 2 discussed above. However, it should be clarified that all NFs depicted in FIG. 2 can interact with the NEF 300 and the NRF 302 of FIG. 3 as necessary, though not explicitly indicated in FIG. 2.

Some properties of the NFs shown in FIGS. 2 and 3 may be described in the following manner. The AMF 200 provides UE-based authentication, authorization, mobility management, etc. A UE 112 even using multiple access technologies is basically connected to a single AMF 200 because the AMF 200 is independent of the access technologies. The SMF 208 is responsible for session management and allocates Internet Protocol (IP) addresses to UEs 112. It also selects and controls the UPF 214 for data transfer. If a UE 112 has multiple sessions, different SMFs 108 may be allocated to each session to manage them individually and possibly provide different functionalities per session. The AF 212 provides information on the packet flow to the PCF 210 responsible for policy control in order to support QoS. Based on the information, the PCF 210 determines policies about mobility and session management to make the AMF 200 and SMF 208 operate properly. The AUSF 204 supports authentication function for UEs 112 or similar and thus stores data for authentication of UEs 112 or similar while the UDM 206 stores subscription data of the UE 112. The Data Network (DN), not part of the 5GC network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

Figure 4:
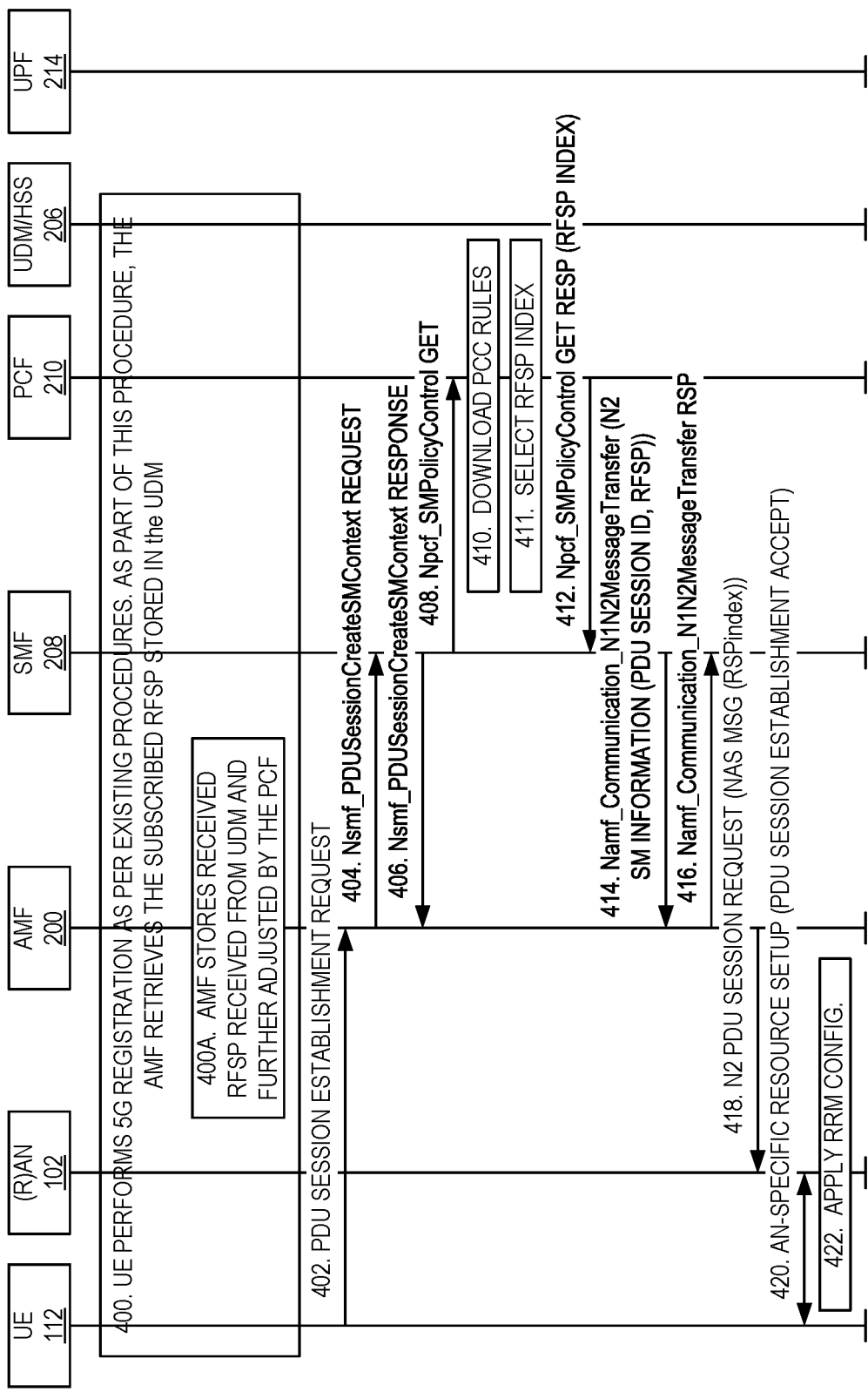
FIG. 4 is a call flow diagram that illustrates a process for dynamically selecting a Radio Access Technology (RAT)/Frequency Selection Priority (RFSP) index for a User Equipment (UE) during Packet Data Unit (PDU) session establishment in accordance with some embodiments of the present disclosure.

As discussed above, embodiments of the present disclosure relate to dynamic selection of a RFSP index for a UE. In this regard, FIG. 4 is a call flow diagram that illustrates a process for dynamically selecting a RFSP index for a UE during PDU session establishment in accordance with some embodiments of the present disclosure. Note that while this example is for a 5G NR network, the process is equally applicable to other types of cellular communications systems such as, e.g., a LTE network.

As illustrated in FIG. 4, a UE 112 registers with the 5G System (5GS) (step 400). This registration procedure is well known and, as such, those details are not repeated here. During registration of the UE 112, the AMF 200 retrieves a subscribed RFSP for the UE 112 from the UDM 206. The subscribed RFSP index for the UE 112 can be adjusted by the PCF 210 considering policy subscription profile and operator policies (e.g., Time of Day). The subscribed RFSP index or the modified subscribed RFSP index is stored by the AMF 200 (step 400A).

PDU session establishment is then performed in accordance with existing PDU establishment procedures. However, as discussed below, the PDU establishment procedure is modified to dynamically select a new RFSP index for the UE 112. To start the PDU establishment, or setup, procedure, the UE 112 send a PDU session establishment request to the AMF 200 (step 402). The AMF 200 then initiates the service Nsmf_PDUSessionCreateSMContext Request with the SMF 208 (step 404). In other words, the AMF 200 sends a Nsmf_PDUSessionCreateSMContext Request message to the SMF 208. The SMF 208 acknowledges the operation to the SMF 208 by sending a Nsmf_PDUSessionCreateSMContext Response message to the AMF 200 (step 406).

The SMF 208 sends a Npcf_SMPolicyControl GET message to the PCF 210 (step 408). Upon receiving this message, the PCF 210 downloads, or otherwise obtains, one or more Policy and Charging Control (PCC) rules to be used to, e.g., select a new RFSP index for the UE 112 (step 410). The PCF 210 then uses the rule(s) to select a new RFSP index for the UE 112 (step 411). More specifically, the PCF 210 selects the new RFSP index for the UE 112 during PDU session setup based on the one or more rules, where the one or more rules are based on criteria such as, e.g., a DNN identified for the PDU session, subscriber data associated with the UE 112, allowed applications for the PDU session of the UE 112, a physical location of the UE 112, and/or information regarding one or more other PDU sessions previously established and still active for the UE 112. More generally, the criteria may be any criteria for selecting the RFSP index for the UE 112 based on the needs (e.g., data rate, latency, QoS, etc.) of the application(s) that may use the PDU session, while possibly taking into account operator policies related to, e.g., the subscriber, location of the UE 112, and/or the like. The subscriber data may include, e.g., an amount of data remaining in a data cap for the subscriber, subscriber's categories, subscriber's allowed services, and the like. The information regarding the other PDU session(s) may include, for example, the DNN(s) for the other PDU session(s), allowed applications for the other PDU session(s), and/or the like.

Once the new RFSP index for the UE 112 is selected, the PCF 210 sends a Npcf_SMPolicyControl GET response message to the SMF 208, where this message includes the new RFSP index selected for the UE 112 (step 412). The SMF 208 relays the new RFSP index selected for the UE 112 to the AMF 200 using a Namf_Communication_N1N2MessageTransfer message that includes the new RFSP index (step 414). The AMF 200 acknowledges via a Namf_Communication_N1N2MessageTransfer response message (step 416). The AMF 200 relays the new RFSP index for the UE 112 to the RAN (i.e., to the respective base station 102) via N2 PDU Session Request message that includes the new RFSP index for the UE 112 (step 418). The RAN (i.e., the base station 102) then communicates with the UE 112 to complete setup of the PDU session (step 420). The RAN (i.e., the base station 102) then applies a RRM configuration that is mapped to the new RFSP index for RRM for the UE 112 (step 422). For example, the RAN applies the RRM configuration for purposes of, e.g., handovers for the UE 112, as will be appreciated by one of skill in the art.

Note that while specific messages such as, e.g., Nsmf_PDUSessionCreateSMContext REQUEST, Npcf_SMPolicyControl GET, Namf_Communicatino_N1N2MessageTransfer, N2 PDU SESSION REQUEST, etc. are used in FIG. 4 and the corresponding description, the names of these messages are the names currently used in 3GPP Release 15, the names of these messages may change. As such, the names of such messages used herein are to be understood as encompassing corresponding messages, regardless of the specific names given to the messages.

Figure 5:
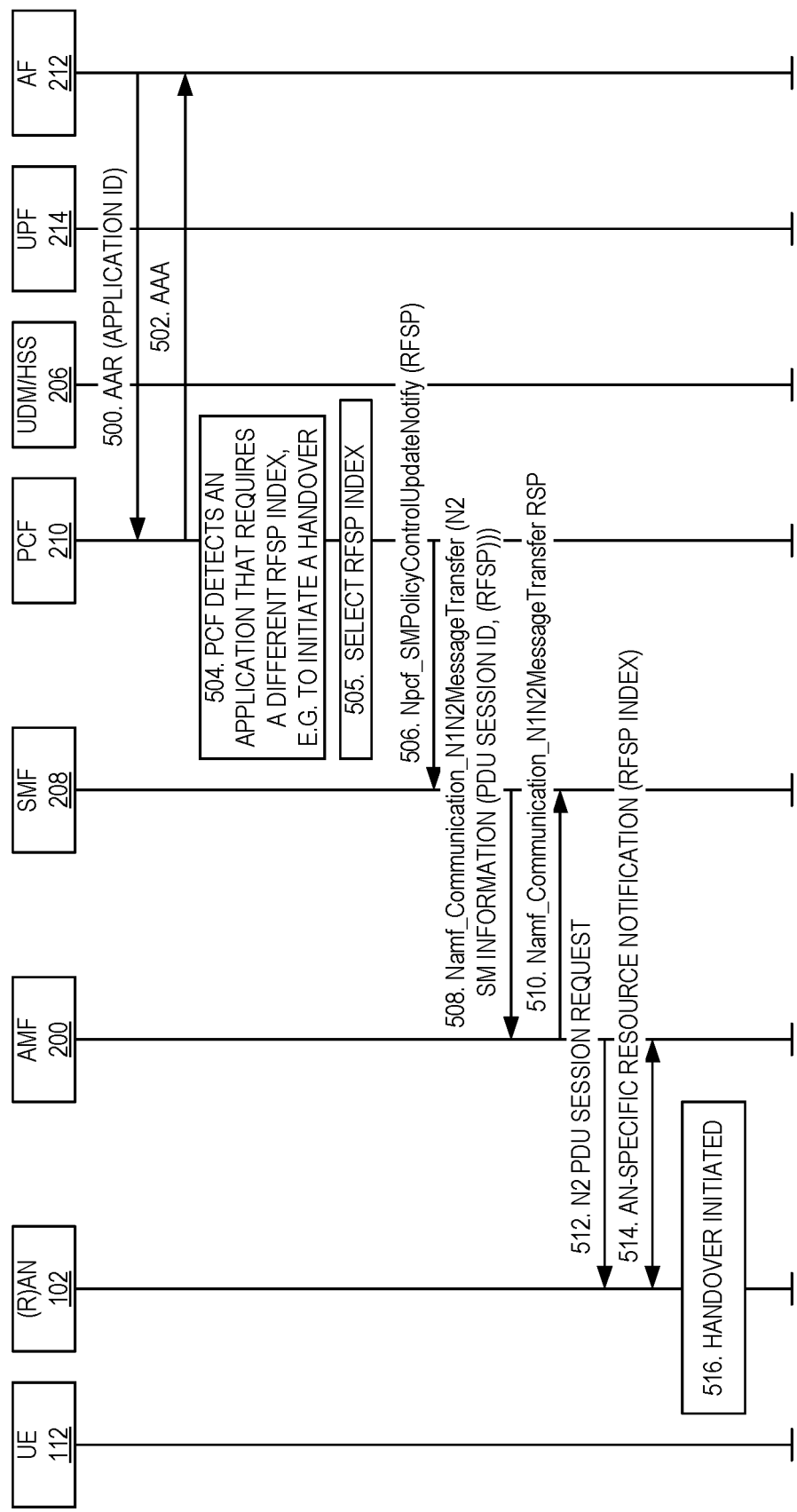
FIG. 5 is a call flow diagram that illustrates a process for dynamically selecting a new RFSP index for a UE in response to detecting a particular application in accordance with some embodiments of the present disclosure.

FIG. 5 is a call flow diagram that illustrates a process for dynamically selecting a new RFSP index for a UE 112 in response to detecting a particular application in accordance with some embodiments of the present disclosure. In other words, the call flow of FIG. 5 illustrates a process in which the PCF 210 determines that the RFSP index of the UE 112 needs to be updated when certain application is initiated and the AF 212 sends a request for network resources to the PCF 210 via the Rx or N5 interface. Note that the Rx interface applies to ECP, while the N4 interface applies to 5GC. Typically, the PCF/PCRF is implemented as a single node that can use both of these interfaces. This is why, in this disclosure, Diameter is sometimes used with 5GC. The PCF 210 determines an updated RFSP index, which is then provided to the SMF 208. The SMF 208 sends the updated RFSP index for the UE 112 to the AMF 200, and the AMF 200 provides the updated RFSP index to the RAN via N2. In the illustrated example, the RAN initiates a handover of the UE 112 (e.g., a handover from 5G NR to LTE) to an AN that is more suitable for the detected application.

Note that multiple applications can share the same PDU session. In that case, the procedure below may be executed each time an application is initiated and the AF requests network resources to the PCF 210 via the Rx interface. However, the RFSP index is updated based on all of the applications that are using the PDU session. In other words, in some embodiments, an operator configured policy in the PCF/PCRF considers the potential interaction between applications and updates the RFSP index accordingly, e.g., the highest priority application available dictate which RFSP index is chosen. As an example, assume there is an application A using the PDU session. Then, a new application B is detected. The RFSP index is then updated based on, e.g., whether a handover should be performed for both applications A and B or not or whether a handover should be performed when considering the highest priority application among applications A and B.

Note that while this example of FIG. 4 is for a 5G NR network, the process is equally applicable to other types of cellular communications systems such as, e.g., a LTE network.

As illustrated in FIG. 5, in this example, the PCF 210 detects an application based on a request from a respective AF 212. In particular, in the conventional manner, the AF 212 sends a Diameter Authentication-Authorization-Request (AAR) to the PCF 210 (step 500), and the PCF 210 sends an Authentication-Authorization-Accept (AAA) to the AF 212 (step 502). Based on the AAR, the PCF 210 detects that a respective application is being used by the UE 112 (step 504). In this example, the detected application requires a new RFSP index for the UE 112, e.g., in order to trigger a handover of the UE 112. The PCF 210 selects a new RFSP index for the UE 112 based on the detected application (e.g., based on the detection of the application) and, optionally, any one or any combination of the criteria discussed above (step 505).

Once the new RFSP index for the UE 112 is selected, the PCF 210 sends a Npcf_SMPolicyControlUpdateNotify message to the respective SMF 208, where this message includes the new RFSP index selected for the UE 112 (step 506). The SMF 208 relays the new RFSP index selected for the UE 112 to the AMF 200 using a Namf_Communication_N1N2MessageTransfer message that includes the new RFSP index (step 508). The AMF 200 acknowledges via a Namf_Communication_N1N2MessageTransfer response message (step 510). The AMF 200 sends a N2 PDU Session Request message to the RAN (e.g., to the respective base station 102) (step 512). The AMF 200 then communicates with the RAN (e.g., with the base station 102), during which the AMF 200 relays the new RFSP index for the UE 112 to the RAN (i.e., to the respective base station 102) (step 514). The RAN (i.e., the base station 102) then applies a RRM configuration that is mapped to the new RFSP index for RRM for the UE 112. In this example, based on this RRM configuration, the RAN (e.g., the base station 102) performs a handover of the UE 112 (step 516).

Note that while specific messages such as, e.g., Npcf_SMPolicyControlUpdateNotify, Namf_Communication_N1N2MessageTransfer, N2 SESSION REQUEST, etc. are used in FIG. 5 and the corresponding description, the names of these messages are the names currently used in 3GPP Release 15, the names of these messages may change. As such, the names of such messages used herein are to be understood as encompassing corresponding messages, regardless of the specific names given to the messages.

Again, the description above focuses on 5GC, but can also be mapped to LTE (e.g., mapped from the 5GC to the EPC) where the Policy and Charging Rules Function (PCRF) in the EPC provides the updated RFSP index to the P-GW, the P-GW provides the updated RFSP index to the Serving Gateway (S-GW), the S-GW provides the updated RFSP index to the MME, and eventually the updated RFSP index is provided to the RAN. The PDU session in 5GC can be mapped to the PDN session in EPC.

Also note that, during handover from 5GC to EPC (or vice versa), the PCF/PCRF is informed about the mobility and may provide a modified RFSP index to be used in the new RAT. This solution may be supported in both 5GC and EPC, in which case handover may be from EPC to 5GC or from 5GC to EPC.

Figure 6:
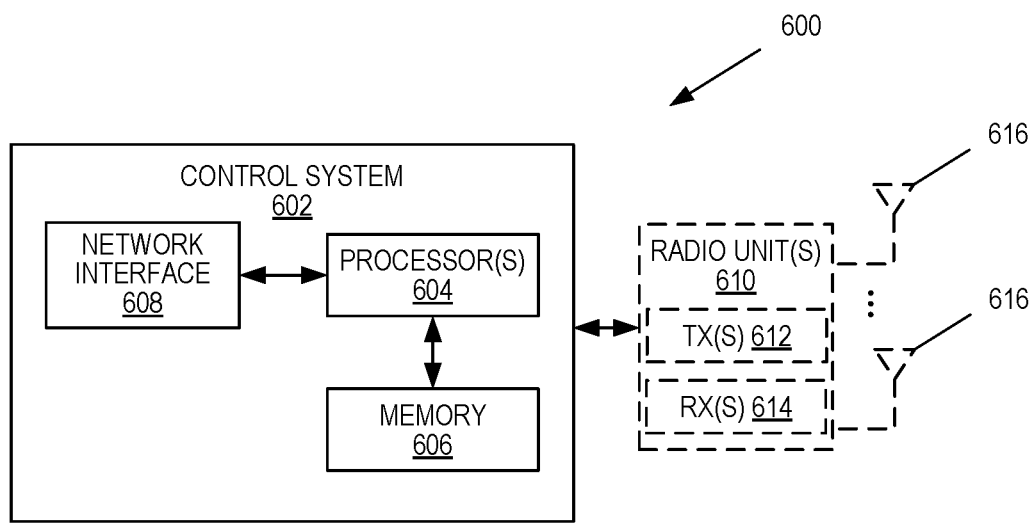
FIG. 6 is a schematic block diagram of a network node according to some embodiments of the present disclosure.

FIG. 6 is a schematic block diagram of a network node 600 according to some embodiments of the present disclosure. The network node 600 may be a node that implements a core network entity (e.g., a node implementing a core network function such as, e.g., the PCF 210, the SMF 208, or the AMF 200) or a radio access node (e.g., the base station 102). As illustrated, the network node 600 includes a control system 602 that includes one or more processors 604 (e.g., Central Processing Units (CPUs), Application Specific Integrated Circuits (ASICs), Field Programmable Gate Arrays (FPGAs), and/or the like), memory 606, and a network interface 608. The one or more processors 604 are also referred to herein as processing circuitry.

In addition, if the network node 600 is a radio access node, the network node 600 includes one or more radio units 610 that each includes one or more transmitters 612 and one or more receivers 614 coupled to one or more antennas 616. The radio units 610 may be referred to or be part of radio interface circuitry. In some embodiments, the radio unit(s) 610 is external to the control system 602 and connected to the control system 602 via, e.g., a wired connection (e.g., an optical cable). However, in some other embodiments, the radio unit(s) 610 and potentially the antenna(s) 616 are integrated together with the control system 602.

The one or more processors 604 operate to provide one or more functions of a network node 600 (e.g., the functions of a core network entity or the functions of a radio access node) as described herein. In some embodiments, the function(s) are implemented in software that is stored, e.g., in the memory 606 and executed by the one or more processors 604.

Figure 7:
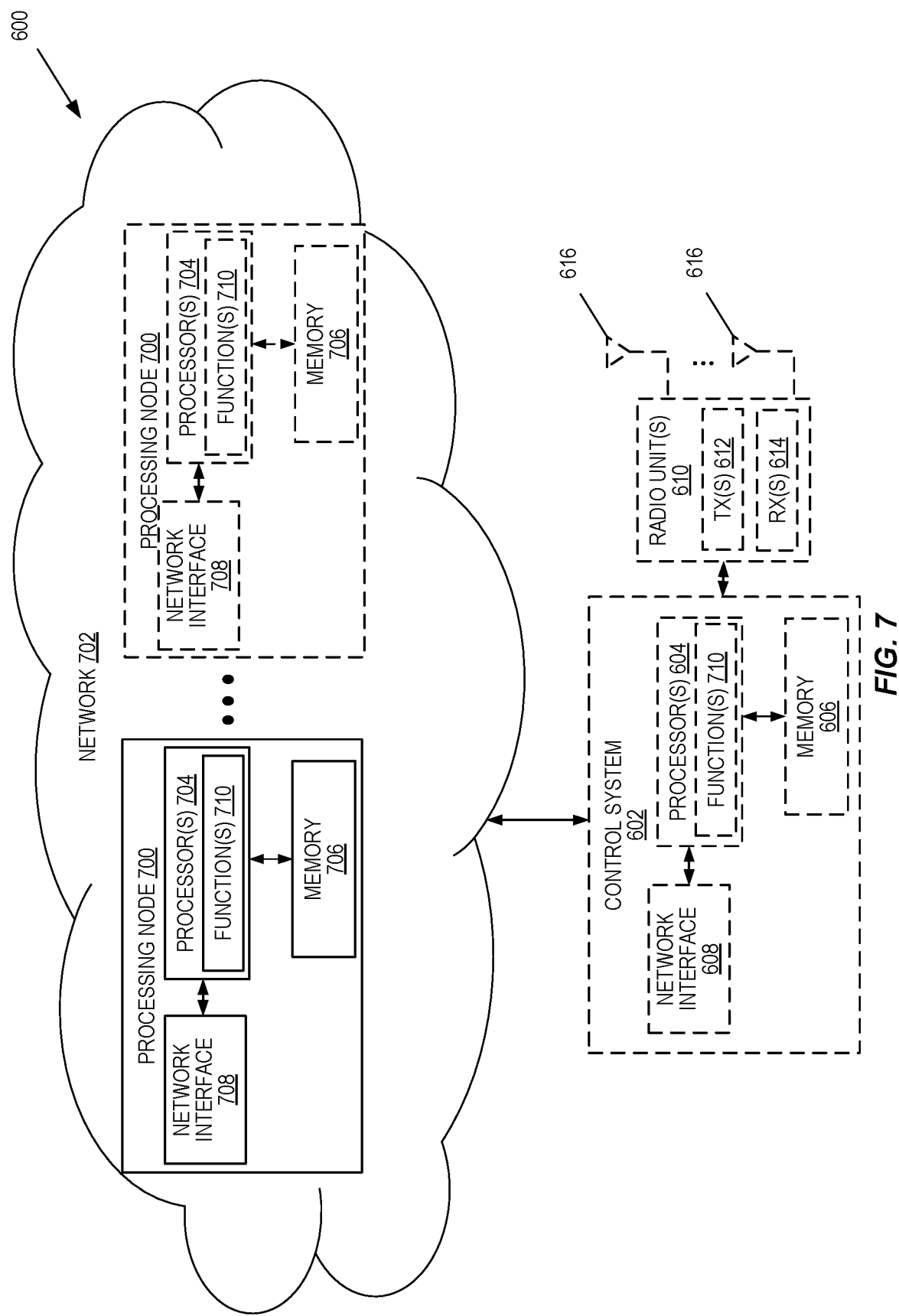
FIG. 7 is a schematic block diagram that illustrates a virtualized embodiment of the network node of FIG. 6 according to some embodiments of the present disclosure.

FIG. 7 is a schematic block diagram that illustrates a virtualized embodiment of the network node 600 according to some embodiments of the present disclosure. As used herein, a "virtualized" network node is an implementation of the network node 600 in which at least a portion of the functionality of the network node 600 is implemented as a virtual component(s) (e.g., via a virtual machine(s) executing on a physical processing node(s) in a network(s)). As illustrated, in this example, the network node 600 includes one or more processing nodes 700 coupled to or included as part of a network(s) 702 via the network interface 608. Each processing node 700 includes one or more processors 704 (e.g., CPUs, ASICs, FPGAs, and/or the like), memory 706, and a network interface 708.

In addition, if the network node 600 is a radio access node, the network node 600 includes the one or more radio units 610 that each includes the one or more transmitters 612 and the one or more receivers 614 coupled to the one or more antennas 616, and optionally the control system 602 that includes the one or more processors 604 (e.g., CPUs, ASICs, FPGAs, and/or the like), the memory 606, and the network interface 608.

In this example, functions 710 of the network node 600 described herein (e.g., the functions of the core network entity such as, e.g., the PCF 210, the SMF 208, or the AMF 200 or a radio access node such as, e.g., the base station 102) are implemented at the one or more processing nodes 700 or distributed across the control system 602 and the one or more processing nodes 700 in any desired manner. In some particular embodiments, some or all of the functions 710 of the network node 600 described herein are implemented as virtual components executed by one or more virtual machines implemented in a virtual environment(s) hosted by the processing node(s) 700. As will be appreciated by one of ordinary skill in the art, additional signaling or communication between the processing node(s) 700 and the control system 602 is used in order to carry out at least some of the desired functions 710.

In some embodiments, a computer program including instructions which, when executed by at least one processor, causes the at least one processor to carry out the functionality of network node 600 or a node (e.g., a processing node 700) implementing one or more of the functions 710 of the network node 600 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 8:
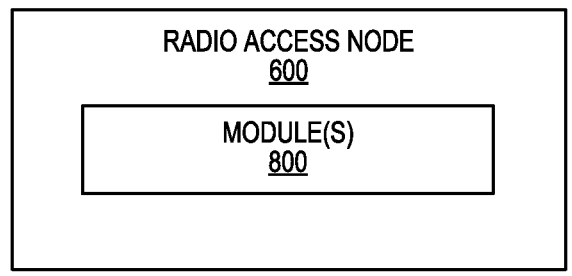
FIG. 8 is a schematic block diagram of the network node of FIG. 6 according to some other embodiments of the present disclosure.

FIG. 8 is a schematic block diagram of the network node 600 according to some other embodiments of the present disclosure. The network node 600 includes one or more modules 800, each of which is implemented in software. The module(s) 800 provide the functionality of the network node 600 (e.g., the functionality of the core network entity or radio access node) described herein. This discussion is equally applicable to the processing node 700 of FIG. 7 where the modules 800 may be implemented at one of the processing nodes 700 or distributed across multiple processing nodes 700 and/or distributed across the processing node(s) 700 and the control system 602.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

At least some of the following abbreviations may be used in this disclosure. If there is an inconsistency between abbreviations, preference should be given to how it is used above. If listed multiple times below, the first listing should be preferred over any subsequent listing(s).

2G Second Generation
3G Third Generation
3GPP Third Generation Partnership Project
4G Fourth Generation
5G Fifth Generation
5GC Fifth Generation Core
5GS Fifth Generation System
AAA Authentication-Authorization-Accept
AAR Authentication-Authorization-Request
AF Application Function
AMF Access and Mobility Management Function
AN Access Network
ASIC Application Specific Integrated Circuit
AUSF Authentication Server Function
CPU Central Processing Unit
CS Circuit Switched
DN Data Network
DNN Data Network Name
DSP Digital Signal Processor eNB Enhanced or Evolved Node B
EPC Evolved Packet Core
FPGA Field Programmable Gate Array
gNB New Radio Base Station
IMS Internet Protocol Multimedia Subsystem
IP Internet Protocol
LTE Long Term Evolution
MME Mobility Management Entity
MTC Machine Type Communication
NEF Network Exposure Function
NF Network Function
NR New Radio
NRF Network Repository Function
NSSF Network Slice Selection Function
PCC Policy and Charging Control
PCF Policy Control Function
PCRF Policy and Charging Rules Function
PDN Packet Data Network
PDU Packet Data Unit
P-GW Packet Data Network Gateway
QoS Quality of Service
RAM Random Access Memory
RAN Radio Access Network
RAT Radio Access Technology
RFSP Radio Access Technology/Frequency Selection Priority
ROM Read Only Memory
RRH Remote Radio Head
RRM Radio Resource Management
RTT Round Trip Time
S-GW Serving Gateway
SMF Session Management Function
TS Technical Specification
UDM Unified Data Management
UE User Equipment
UPF User Plane Function Those skilled in the art will recognize improvements and modifications to the embodiments of the present disclosure. All such improvements and modifications are considered within the scope of the concepts disclosed herein.

What is claimed is:

1. A method of operation of a core network entity in a core network of a cellular communications system, comprising:
dynamically selecting a Radio Access Technology (RAT)/Frequency Selection Priority (RFSP) index for a User Equipment (UE) during setup of a packet data session for the UE, wherein the RFSP index is an index to a specific Radio Resource Management (RRM) configuration for the UE;
sending a message comprising the dynamically selected RFSP index to another core network entity, wherein the another core network entity is a Session Management Function (SMF) associated with the UE;
after setup of the packet data session for the UE is complete, detecting an application that requires an updated RFSP index, wherein the application is using the packet data session of the UE, and wherein the application is detected out of a plurality of applications loaded in the UE;
selecting a new RFSP index for the UE based on the detected application; and
sending a message comprising the selected new RFSP index to the SMF associated with the UE.

2. The method of claim 1, wherein dynamically selecting the RFSP index for the UE during setup of the packet data session for the UE comprises dynamically selecting the RFSP index for the UE during setup of the packet data session for the UE based on one or more rules, the one or more rules is based on:
a Data Network Name (DNN) identified for the packet data session;
subscriber data associated with the UE;
allowed applications, and their characteristics, for a packet data session associated with the UE;
a physical location of the UE; and/or
one or more other packet data sessions of the UE.

3. The method of claim 2, wherein the one or more rules comprise at least one rule that is based on the subscriber data associated with the UE, and the subscriber data comprises an amount of data consumed by a subscriber associated with the UE from a specified data limit for the subscriber.

4. The method of claim 1, wherein the core network entity is a Policy Control Function (PCF) and the method further comprises:
receiving a message from the SMF during setup of the packet data session for the UE.

5. The method of claim 1, wherein the new RFSP index is an RFSP index that initiates a handover decision for the UE.

6. The method of claim 1, wherein selecting the new RFSP index for the UE comprises selecting the new RFSP index for the UE based on the detected application and one or more rules, the one or more rules are based on:
a DNN identified for the packet data session;
subscriber data associated with the UE;
allowed applications for a packet data session associated with the UE;
a physical location of the UE; and/or
one or more other packet data sessions of the UE.

7. The method of claim 1, wherein the method further comprises receiving a message from an application function, and sending the message comprises sending the message to the SMF associated with the UE in response to receiving the message from the application function.

8. A node implementing a core network entity for a core network of a cellular communications system, comprising:
a network interface;
one or more processors; and
memory storing instructions executable by the one or more processors whereby the node is operable to:
dynamically select a Radio Access Technology (RAT)/Frequency Selection Priority (RFSP) index for a User Equipment (UE) during setup of a packet data session for the UE, wherein the RFSP index is an index to a specific Radio Resource Management (RRM) configuration for the UE;
send a message comprising the dynamically selected RFSP index to another core network entity, wherein the another core network entity is a Session Management Function (SMF) associated with the UE;
after setup of the packet data session for the UE is complete, detect an application that requires an updated RFSP index, wherein the application is using the packet data session of the UE, and wherein the application is detected out of a plurality of applications loaded in the UE;
select a new RFSP index for the UE based on the detected application; and
send a message comprising the selected new RFSP index to the SMF associated with the UE.

9. A method of operation of a radio access node in a radio access network of a cellular communications system, comprising:

receiving a Radio Access Technology (RAT)/Frequency Selection Priority (RFSP) index for a User Equipment (UE) during setup of a packet data session for the UE, the RFSP index is an index to a specific Radio Resource Management (RRM) configuration for the UE;

applying the specific RRM configuration indexed by the RFSP index for the UE;

after setup of the packet data session for the UE is complete, receiving a new RFSP index for the UE, wherein the new RFSP is updated based on detection of an application that requires an updated RFSP index, wherein the application is using the packet data session of the UE, wherein the application is detected out of a plurality of applications loaded in the UE, wherein a message comprising the new RFSP index is sent to another core network entity, and wherein the another core network entity is a Session Management Function (SMF) associated with the UE; and applying a new RRM configuration that is mapped to the new RFSP index for the UE.

10. The method of claim 9, wherein:

receiving the RFSP index for the UE during setup of the packet data session for the UE comprises receiving a packet data session request message from a core network entity, the packet data session request message comprising the RFSP index.

11. A radio access node for a radio access network of a cellular communications system, comprising:

a network interface;
one or more processors; and
memory storing instructions executable by the one or more processors whereby the radio access node is operable to:
receive a Radio Access Technology (RAT)/Frequency Selection Priority (RFSP) index for a User Equipment (UE) during setup of a packet data session for the UE, wherein the RFSP index is an index to a specific Radio Resource Management (RRM) configuration for the UE;
apply the specific RRM configuration indexed by the RFSP index for the UE;
after setup of the packet data session for the UE is complete, receive a new RFSP index for the UE, wherein the new RFSP is updated based on detection of an application that requires an updated RFSP index, wherein the application is using the packet data session of the UE, wherein the application is detected out of a plurality of applications loaded in the UE, wherein a message comprising the new RFSP index is sent to another core network entity, and wherein the another core network entity is a Session Management Function (SMF) associated with the UE; and
apply a new RRM configuration that is mapped to the new RFSP index for the UE.

12. The radio access node of claim 11, wherein, in order to receive the RFSP index for the UE during setup of the packet data session for the UE, the radio access node is further operable to receive a packet data session request message from a core network entity, the packet data session request message comprising the RFSP index.

13. A method of operation of a core network entity in a core network of a cellular communications system, comprising:

detecting an application that is using a packet data session of a User Equipment (UE);
selecting a Radio Access Technology (RAT)/Frequency Selection Priority (RFSP) index for the UE based on the detected application, the RFSP index is an index to a specific Radio Resource Management (RRM) configuration for the UE;
sending a message comprising the RFSP index to another core network entity, wherein the another core network entity is a Session Management Function (SMF) associated with the UE;
detecting an application that requires an updated RFSP index, wherein the application is using the packet data session of the UE, and wherein the application is detected out of a plurality of applications loaded in the UE;
selecting a new RFSP index for the UE based on the detected application; and
sending a message comprising the selected new RFSP index to the SMF associated with the UE.

14. The method of claim 13, wherein selecting the RFSP index for the UE comprises selecting the RFSP index for the UE based on the detected application and one or more rules, the one or more rules are based on:
a Data Network Name (DNN) identified for the packet data session;
subscriber data associated with the UE;
allowed applications for a packet data session associated with the UE;
a physical location of the UE; and/or
one or more other packet data sessions of the UE.

15. The method of claim 14, wherein the one or more rules comprise at least one rule that is based on the subscriber data associated with the UE, and the subscriber data comprises an amount of data consumed by a subscriber associated with the UE from a specified data limit for the subscriber.

16. The method of claim 13, wherein the core network entity is a Policy Control Function (PCF).

17. The method of claim 16, wherein the method further comprises receiving, a message from an application function, and sending the message comprises sending the message comprising the selected RFSP index to the SMF associated with the UE in response to receiving the message from the application function.

18. A node implementing a core network entity for a core network of a cellular communications system, comprising:
a network interface;
one or more processors; and
memory storing instructions executable by the one or more processors whereby the node is operable to:
detect an application that requires an updated RFSP index, wherein the application is using a packet data session of a User Equipment (UE), and wherein the application is detected out of a plurality of applications loaded in the UE;
select a Radio Access Technology (RAT)/Frequency Selection Priority, (RFSP) index for the UE based on the detected application, wherein the RFSP index is an index to a specific Radio Resource Management (RRM) configuration for the UE;
send a message comprising the updated RFSP index to another core network entity, wherein the another core network entity is a Session Management Function (SMF) associated with the UE.

19. A method of operation of a radio access node in a radio access network of a cellular communications system, comprising:
receiving a new Radio Access Technology (RAT)/Frequency Selection Priority (RFSP) index for a User Equipment (UE) after setup of a packet data session for the UE, wherein the new RFSP index is an index to a specific Radio Resource Management (RRM) configuration for the UE, wherein the new RFSP is received based on detection of an application that requires an updated RFSP index, wherein the application is detected out of a plurality of applications loaded in the UE, wherein a message comprising the new RFSP index is sent to another core network entity, and wherein the another core network entity is a Session Management Function (SMF) associated with the UE; and applying the specific RRM configuration indexed by the new RFSP index for the UE.

20. The method of claim 19, wherein:

receiving the new RFSP index for the UE comprises receiving a session request message from a core network entity, the session request message comprising the new RFSP index.

21. A radio access node for a radio access network of a cellular communications system, comprising:

a network interface;

one or more processors; and memory storing instructions executable by the one or more processors whereby the radio access node is operable to:

receive a new Radio Access Technology (RAT)/Frequency Selection Priority (RFSP) index for a User Equipment (UE) after setup of a packet data session for the UE, wherein the new RFSP index is an index to a specific Radio Resource Management (RRM) configuration for the UE, wherein the new RFSP is received based on detection of an application that requires an updated RFSP index, wherein the application is detected out of a plurality of applications loaded in the UE, wherein a message comprising the new RFSP index is sent to another core network entity, and wherein the another core network entity is a Session Management Function (SMF) associated with the UE; and apply the specific RRM configuration indexed by the new RFSP index for the UE.

22. The radio access node of claim 21, wherein, in order to receive the new RFSP index for the UE, the radio access node is further operable to receive a session request message from a core network entity, the session request message comprising the new RFSP index.

* * * * *